United States Patent [19]

Esser

[11] 3,809,923

[45] May 7, 1974

[54] TRANSVERSAL FILTER

[75] Inventor: Leonard Jan Maria Esser, Emmasingel, Eindhoven, Netherlands

[73] Assignee: U.S. Philips Corporation, New York, N.Y.

[22] Filed: Jan. 29, 1973

[21] Appl. No.: 327,474

[30] Foreign Application Priority Data

Feb. 17, 1972 Netherlands ........................ 7202070

[52] U.S. Cl. .......... 307/221 D, 307/221 R, 328/167, 333/18, 333/70 T

[51] Int. Cl. ........................ H03k 5/159, G11c 11/40

[58] Field of Search ....... 307/221 R, 221 D; 333/18, 333/70 T; 328/167

[56] References Cited

UNITED STATES PATENTS

| | | | |
|---|---|---|---|
| 3,546,490 | 12/1970 | Sangster | 307/221 D |
| 3,621,283 | 11/1971 | Teer et al. | 307/221 D |

*Primary Examiner*—John Zazworsky
*Attorney, Agent, or Firm*—Frank R. Trifari; Simon L. Cohen

[57] ABSTRACT

Transversal filter having adjustable weighting factors and including a bucket-brigade store as a shift register. The bucket-brigade store comprises a sequence of capacitors which are connected to each other by the main current paths of transistors. Each of the circuits comprising the series combination of a main current path and two capacitors includes a current dividing device the outputs of which are connected to a summing device. The values of the said weighting factors are determined by the current dividing ratios of the current dividing devices.

4 Claims, 5 Drawing Figures

TRANSVERSAL FILTER

Figure 1:
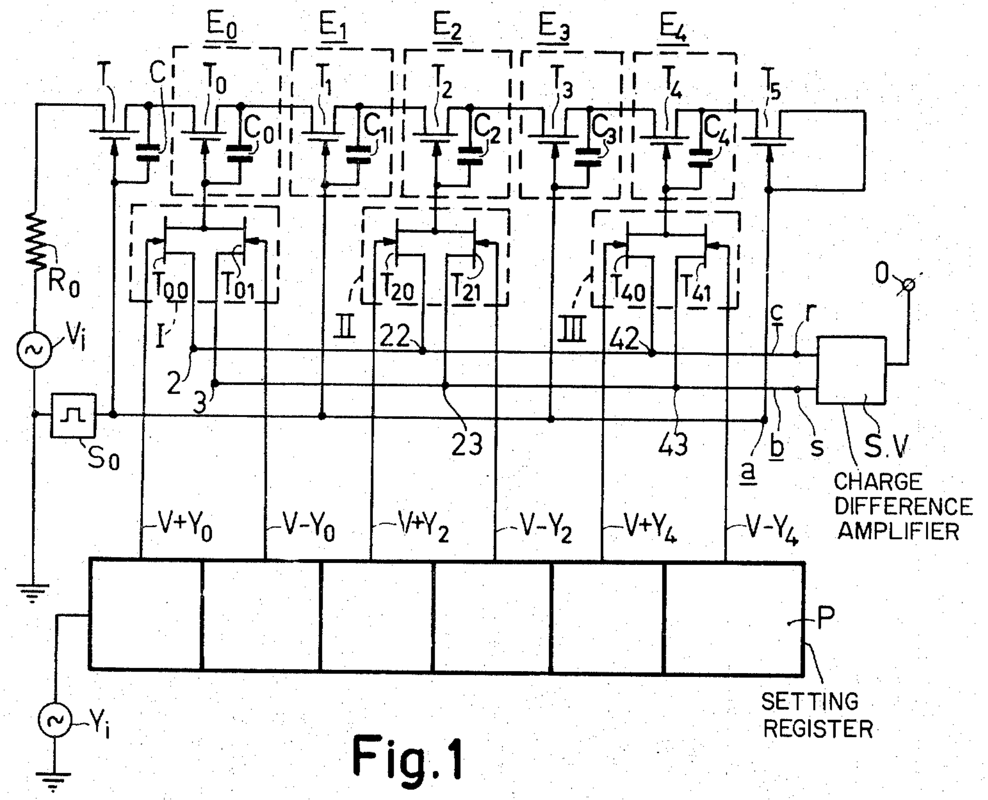

The invention relates to a transversal filter having adjustable weighting factors which includes a sequence of storage elements which each comprise at least a capacitor and a control electrode, each of the capacitors of a storage element being coupled to the capacitor of a succeeding storage element via a transfer circuit, means being provided for supplying clock pulses to the control electrodes of the storage elements for controlling the charge transfer between the capacitors coupled by the said transfer circuits, while at least some of the non-adjacent storage stages are coupled via setting means to a summation device which sums the signals which in the storage elements each time are shifted over a time interval of the shift period.

A transversal filter of the said kind is described in U.S. Pat. No. 3,474,260. The control electrode of each storage element is constituted by a terminal of the capacitor of the respective storage element. Each transfer circuit comprises the series connection of the main current path of a bipolar transistor and a diode the pass direction of which is the same as that of the base emitter junction of the associated transistor. The bases of the said transistors are connected to earth. The control electrodes of the odd-numbered storage elements are jointly connected to a second clock-pulse line. The emitters of the transistors of non-adjacent storage elements are connected to the summation device via variable resistors. These variable resistors form the adjusting means for setting the weighting factors of the transversal filter.

This known traversal filter is destructive. This means that when in the known transversal filter change is transferred between a first and a second capacitor charge is lost. This is due to the fact that only part of the information-containing charge from the first capacitor is transferred to the second capacitor via the main current path of the transistor connected between the first and second capacitors. The remainder of the information-containing charge will flow to the summing device via the resistor connected to the first capacitor. This remaining part of the charge is inversely proportional to the resistance value of the said resistor. Consequently, the smaller the resistance value, the more information-containing charge will flow through the respective resistor and the less information-containing charge will be transferred to the second capacitor. As a result, the number of storage elements which the sequence can include is greatly restricted, and moreover a given weighting factor depends upon the values of all the preceding weighting factors. The latter implies that proportioning of the known transversal filter is difficult. The fact that the length of the sequence of storage elements is restricted furthermore renders the known transversal filter unsuitable for some uses, such as, for example, a matched filter in radar systems.

It is an object of the present invention to provide a solution for the aforementioned problems, and the invention is characterized in that the setting means are constituted by current dividing devices which are connected in the circuits which each comprise the series combination of a transfer circuit and the capacitors coupled thereto, each current dividing device having a current input and two current outputs, which current outputs are coupled to the inputs of a charge difference amplifier which also forms the summing device.

Figure 2:
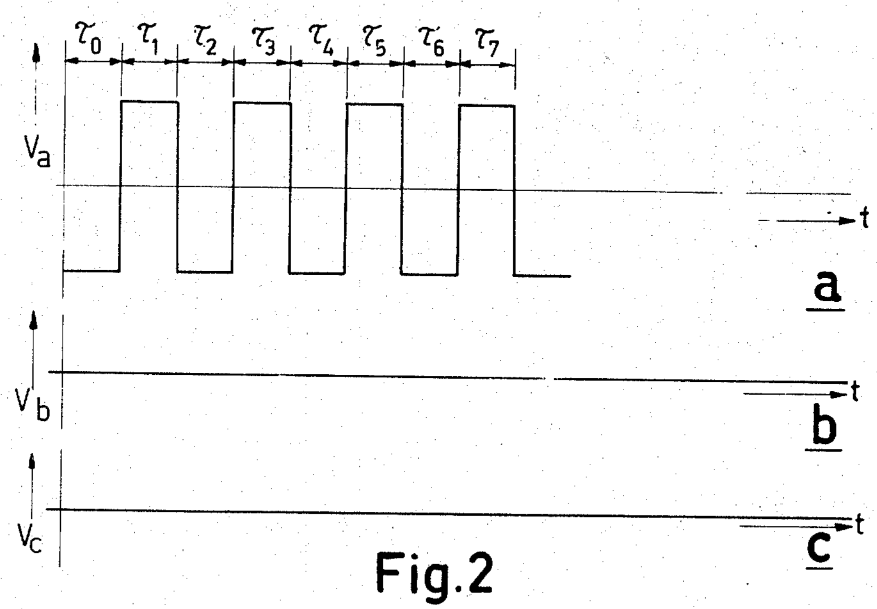
Figure 3:
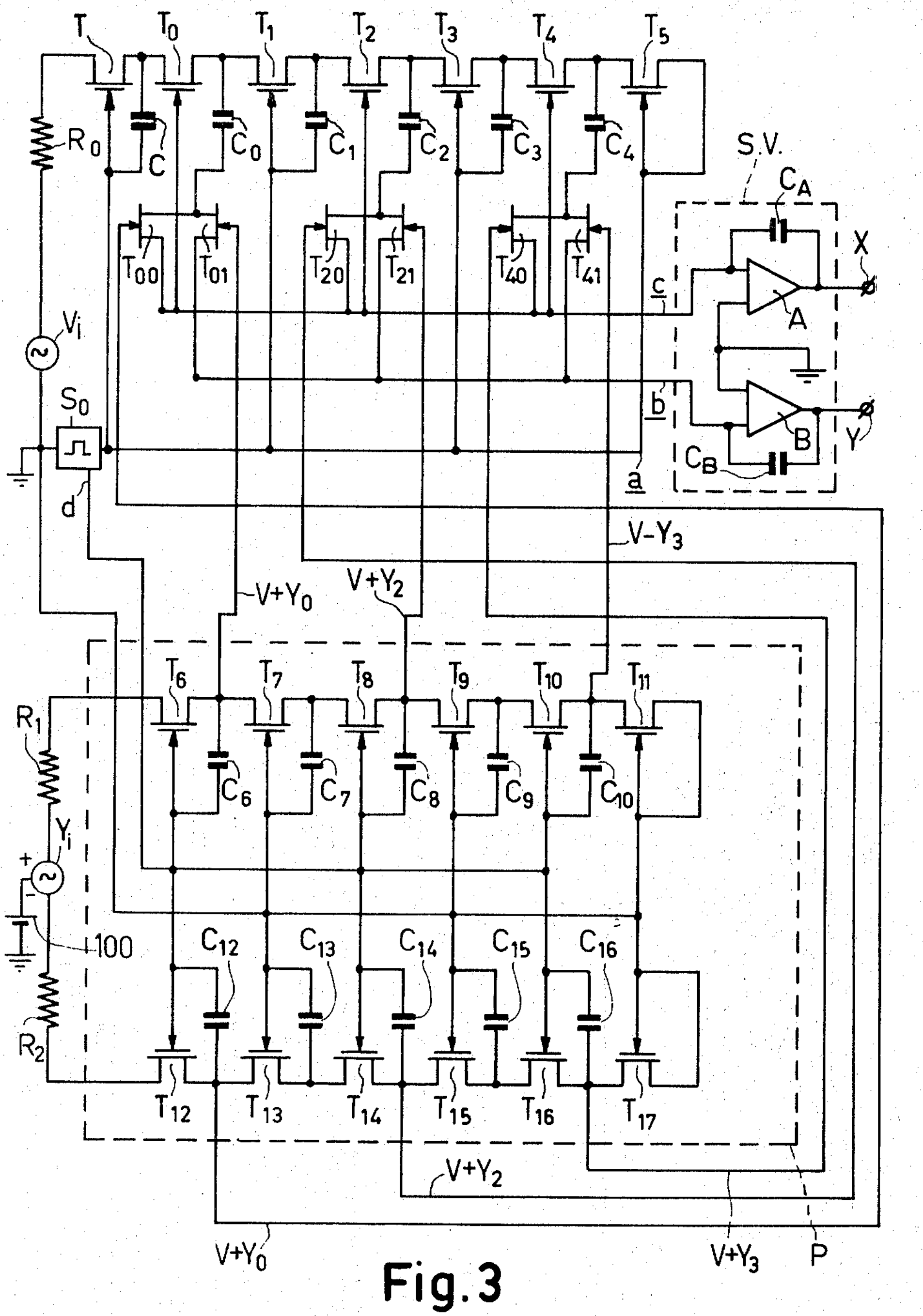
Figure 4:
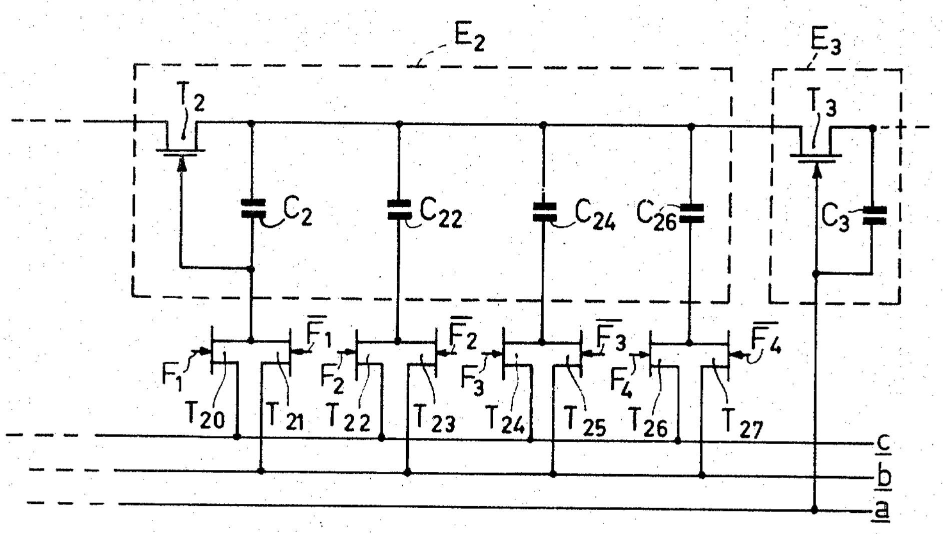
Figure 5:
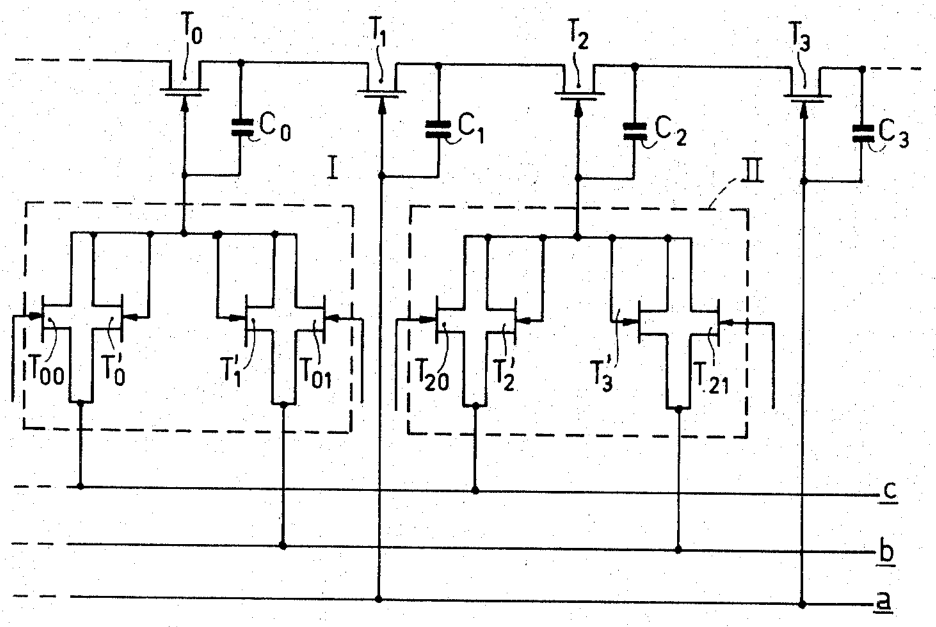

Embodiments of the invention will now be described, by way of example, with reference to the accompanying diagrammatic drawings, in which:

FIG. 1 shows a first embodiment of the transversal filter according to the invention, FIG. 2 shows voltage waveforms illustrating the operation of the transversal filter, FIG. 3 shows a second embodiment of the transversal filter according to the invention, FIG. 4 shows a third embodiment of the transversal filter according to the invention, and FIG. 5 shows a fourth embodiment of the transversal filter according to the invention.

Referring now to FIG. 1, a transversal filter comprises a sequence of storage elements $E_0$, $E_1$, $E_2$, $E_3$ and $E_4$. These storage elements, adjacent capacitors, are interconnected via transfer circuits which each comprise the main current path of a field-effect transistor. The source electrode of the transistor $T_0$ is connected to a point of constant potential via the series combination of the main current path of a transistor T, a resistor $R_0$ and an input signal voltage source $V_i$. A capacitor C is connected between the drain and the gate of the transistor T. The gate of the transistor T is connected to a clock pulse line *a*. The transistor T, the capacitor C and the resistor $R_0$ constitute a read circuit for the shift register formed by the storage elements. A capacitor $C_4$ is connected via the main current path of a transistor $T_5$ to the clock pulse line *a* which is connected to an output of a clock pulse signal source So. In each storage element the capacitor is connected between the drain and the gate of the field-effect transistor of the respective storage element. The gates of transistors $T_0$ to $T_4$ of the storage elements $E_0$ to $E_4$ also constitute the control electrodes of the storage elements. A control electrode of the storage element $E_0$ is connected to the current input of the current dividing device I. A current output 2 of the current dividing device I is connected to a line *c*, while a current output 3 is connected to a line *b*. The main current path of a transistor $T_{00}$ is connected between the current input and the current output 2 of the current dividing device I. The main current path of a transistor $T_{01}$ is connected between the current input and the current output 3 of the current dividing device I. A control electrode of the storage element $E_2$ is connected to the current input of a current dividing device II. A current output 22 of the current dividing device II is connected to the line *c*, while a current output 23 is connected to the line *b*. The main current path of a transistor $T_{20}$ is connected between the current input and the current output 22. The main current path of a transistor $T_{21}$ is connected between the current input and the current output 23. A control electrode of the storage element $E_4$ is connected to the current input of a current dividing device III. A current output 42 of the latter device is connected to the line *c* and a current output 43 is connected to the line *b*. The main current path of a transistor $T_{40}$ is connected between the current input and the current output 42 of the current dividing device III. The main current path of a transistor $T_{41}$ is connected between the current input and the current output 43 of the current dividing device III. The gates of the field-effect transistors of the current dividing devices are connected to outputs of a setting register P. The lines *b* and *c* are each connected to an input of a charge difference amplifier SV. The operation of the transversal filter is as follows:

During time intervals $\tau_1$, $\tau_3$, $\tau_5$ of FIG. 2 new information about the value of the input signal $V_i$ is stored as charge in the capacitor C. The information stored in the even-numbered capacitors $C_0$ and $C_2$ is shifted to the odd-numbered capacitors $C_1$ and $C_3$, while in the said time intervals charge is supplied to the even-numbered capacitors $C_0$, $C_2$ and $C_4$, until the charge in these capacitors is equal to a reference charge, which is $(E - V_d)$. C coulombs, where E is the amplitude of the clock signal and $V_d$ is the threshold voltage of the field-effect transistors used. The currents which during the said intervals flow through the main current paths of the transistors $T_1$, $T_3$ and $T_5$ also flow through the respective current dividing devices I, II, and III. In each current dividing device the current supplied to the input is divided into two currents. A simple calculation shows that the currents which flow through the various main current paths of the field-effect transistors of each of the current dividing devices I, II and III satisfy the following relationships:

$$i_{x0} = \beta \cdot V_x(V + Y_x - V_d - \tfrac{1}{2}V_x) \quad (1)$$

$$i_{x1} = \beta \cdot V_x(V - Y_x - V_d - \tfrac{1}{2}V_x) \quad (2)$$

$$i = i_{x0} + i_{x1} \quad (3)$$

$$x = 0, 2, 4 \quad (4)$$

In these relations, $V_x$ is the voltage at the current input of the current dividing device concerned, $(V + Y_x)$ and $(V - Y_x)$ are the output voltages of the setting register P, $V_d$ is the threshold voltage of the field-effect transistors used and $\beta$ is a factor which is determined by the material and the geometry of these field-effect transistors. From the relations 1 and 2 it follows that the difference current $(i_{x0} - i_{x1}) = \Delta i =$ equal to $$\Delta i = Y_x \cdot i/V - V_d \quad (5)$$

It is assumed that $\tfrac{1}{2}V_x$ is negligible with respect to the voltage $(V - V_d)$, which generally will be the case in practice. From the relation 5 it follows that $$\Delta Q_x = (V_x)/(V - V_d) \cdot Q_x \quad (6)$$

where $Q_x$ is the charge deficiency of the storage stage $x$ concerned which is transferred to the adjacent storage stage. The total difference in charge which in a given time interval $\tau_i$ flows through the lines $b$ and $c$ will be equal to $$\Sigma \Delta Q_x = \Sigma (Y_x)/(V - V_d) - Q_x \quad (7)$$

Assuming the signal supplied by the signal voltage source $V_i$ to contain a spectrum component of angular frequency $w$ and amplitude A, then the charge deficiency $Q_0$ present in the capacitor $C_0$ during the time interval $\tau_1$ may be written in complex notation as $C \cdot \tau V \cdot e^{jwt}$, where $C$ is the capacitance value of the storage capacitors $C_0$ to $C_4$, and $\Delta V$ is proportional to the amplitude A of the spectrum component concerned. In the successive storage stages $E_1$, $E_3$ and $E_4$ the said spectrum component is shifted over time intervals $\tau$, $2\tau$, $3\tau$. The charge deficiencies $q_2$ and $q_4$ present in the capacitors $C_2$ and $C_4$ respectively can be written in complex notation:

$C \cdot \Delta V \cdot e^{jw(t - 2\tau)}$ and $C \cdot \Delta V \cdot e^{jw(t - 4\tau)}$ respectively.

Inserting these terms in the aforementioned relation 7 gives:

$$\Sigma \Delta Q_x = C \Delta V \cdot e^{jw(t - 3\tau)} \cdot (Y_0)/(V - V_d) \cdot e^{jw3\tau} + (Y_2)/(V - V_d) \cdot e^{jw\tau} + (Y_4)/(V - V_d) \cdot e^{jw\tau} \quad (8)$$

An arbitrary spectrum component $C \cdot \Delta V \cdot e^{jwt}$ in the frequency spectrum of the signal applied to the capacitor $C_0$ produces an output signal as given in 8, so that the transfer characteristic $H(w)$ of the filter shown in FIG. 1 is:

$$H(w) = e^{-jw3\tau} \cdot [a_1 \cdot e^{jw3\tau} + a_2 e^{jw\tau} + \ldots\ldots + b_1 \cdot e^{-jw\tau} + \ldots] \quad (9)$$

where $a_1 = y_0 \cdot (V - V_d)^{-1}$, $a_2 = Y_2 (V - V_d)^{-1}$ and $b_1 = Y_4 \cdot (V - V_d)^{-1}$.

A suitable choice of the transfer coefficients $a_1$, $a_2$, . . . , $b_1$ . . . , which are frequently referred to as weighting factors, enables a desired amplitude frequency characteristic and a desired phase frequency characteristic to be realized.

Because the setting means I and II of the transversal filter shown in FIG. 1 are connected in series with the capacitors $C_0$ and $C_2$ respectively, transfer of information between the capacitors $C_0$ and $C_1$ and between the capacitors $C_2$ and $C_3$ will not cause information-containing charge to be lost. As a result, the number of storage elements which may be included in the sequence is not restricted by the provision of the said setting means. Consequently a large number of setting means may be connected in cascade, enabling a large number of coefficients $a_1$ etc. to be realized. In addition, the weighting factors may be set independently of one another.

Thus, instead of charging the storage capacitors used in the summation process through a source of shift pulses and leaking part of the charge through weighted resistors as in U.S. Pat. No. 3,474,260, applicant charges the storage capacitors used in the summation process through weighted current dividers I, II and III, the weighting being determined by the signals from the setting register P.

In deriving the formula 5 it was assumed that the voltage $\tfrac{1}{2}V_x$ may be disregarded. This assumption involves an error of about 2 percent in the weighting factor, if all the field-effect transistors are equal. If highly accurate operation is desired, the influence of the voltage $\tfrac{1}{2}V_x$ may be greatly reduced. For example, during the odd time intervals $\tau_1$, . . . in which information is written into the capacitor $C_0$ the voltages $(V + Y_0)$ and $(V - Y_0)$ may be applied to the current dividing device I in the manner shown in FIG. 1, whereas during the subsequent even time intervals $\tau_2$, . . . . the voltage $(V - Y_0)$ is applied to the gate of the transistor $T_{00}$ and the voltage $(V + Y_0)$ is applied to the gate of the transistor $T_{01}$. The same is effected with respect to the voltages $(V + Y_2)$, $(V - Y_2)$ and $(V + Y_4)$, $(V - Y_4)$ for the current dividing devices II and III. This alternation of the setting voltages causes the error to be averaged out. It was found that the residual error owing to $\tfrac{1}{2}V_x$ is only 1 percent.

The same effect is obtainable by connecting the lines $b$ and $c$ alternately to the inputs $s$ and $r$ of the charge difference amplifier SV. Thus, for example, during the time interval $\tau_2$ the line $b$ is connected to the input $r$ and the line $c$ to the input $s$. This also causes the error to be averaged out.

In the embodiment shown in FIG. 3 possible designs of the setting register P and of the charge difference amplifier are shown. Furthermore the gates of the transistors $T_0$, $T_2$, and $T_4$ are connected to the clock pulse line $c$ instead of to the current inputs of the current dividing devices I, II and III. The latter arrangement has the advantage of permitting faster signal transfer between the capacitors. The charge difference amplifier comprises differential amplifiers A and B which each have one input connected to earth. The other input of the amplifier A is connected to its output X via a capacitor $C_A$. The other input of the amplifier B is connected to its output Y via a capacitor $C_B$. The capacitance value of the capacitors $C_A$ and $C_B$ is many times greater than that of the storage capacitors $C_0$ to $C_4 \cdot \Sigma\Delta Q_x$ according to the formula 8 is set up between the outputs X and Y. This is the output signal from the transversal filter. The setting register includes two delay circuits. One delay circuit comprises transistors $T_6$ to $T_{11}$ the main current paths of which are connected in series. Each of these transistors has its drain connected to its gate via a capacitor C denoted by the same number as the respective transistor, except for the transistor $T_{11}$ the drain of which is directly connected to its gate. The second delay circuit comprises transistors $T_{12}$ to $T_{17}$ the main current paths of which also are connected in series. Each of these transistors has its drain connected to its gate via a capacitor C denoted by the same number as the respective transistor, except for the transistor $T_{17}$ the drain of which is directly connected to its gate. The gates of the transistors $T_7$, $T_9$, $T_{11}$, $T_{13}$, $T_{15}$ and $T_{17}$ are connected to earth, while the gates of the transistors $T_6$, $T_8$, $T_{10}$, $T_{12}$, $T_{14}$ and $T_{16}$ are connected to an output $d$ of the switching voltage source $S_0$. The source of the transistor $T_6$ is connected to a signal voltage source $Y_i$ via a resistor $R_1$. The source of the transistor $T_{12}$ is connected to the signal voltage source $Y_i$ via a resistor $R_2$. The signal voltage source $Y_i$ is also connected to a point of constant potential via a direct-voltage source 100.

The setting register P may be operated in a variety of different ways. Before the input signal to be filtered is applied to the first transistor $T_0$, setting signals $(v \pm Y_x)$, where $x = 0, 2, 4$, may be stored in the setting register by means of the switching voltage source $S_0$ and the signal source $Y_i$. Furthermore instead of said weighting factors variable weighting factors may be used. This may be effected, for example, by shifting the setting voltages present in the setting register P at least one position during the time intervals which precede the intervals in which information is transferred between adjacent storage capacitors. When digital signals are processed by the transversal filter shown in FIG. 3, the setting register P may be, instead of the analog shift register shown, a digital shift register composed of bistable elements.

FIG. 4 shows that instead of the storage stages shown in FIG. 1, for example $E_2$, other storage stages may be used. The storage stage $E_2$ shown comprises the transistor $T_2$ and capacitors $C_2$, $C_{22}$, $C_{24}$ and $C_{26}$. The capacitor $C_2$ is connected between the gate and the drain of the transistor $T_2$. The gate of the transistor $T_2$ is also connected to the current input of a current dividing device which comprises transistors $T_{20}$ and $T_{21}$ and the current outputs of which are connected to the lines $c$ and $b$ respectively. The capacitor $C_{22}$ is connected to the current input of the current dividing device which comprises transistors $T_{22}$ and $T_{23}$ and the current outputs of which are connected to the lines $c$ and $b$ respectively. The capacitor $C_{24}$ is connected to the current input of a current dividing device which comprises transistors $T_{24}$ and $T_{25}$ and the current outputs of which are connected to the lines $c$ and $b$ respectively. The capacitor $C_{26}$ is connected to the current input of a current dividing device which comprises transistors $T_{26}$ and $T_{27}$ and the current outputs of which are connected to the lines $c$ and $b$ respectively. The capacitance values of the capacitors $C_2$, $C_{22}$, $C_{24}$, $C_{26}$ and $C_3$ are, for example, C, 2C, 4C, 8C and 15C farads respectively. By means of a first setting register (not shown) digital signals $F_1$ and $\overline{F}_1$ are applied to the gates of the transistors $T_{20}$ and $T_{21}$. By means of a second setting register (not shown) digital signals $F_2$ and $\overline{F}_2$ are applied to the gates of the transistors $T_{22}$ and $T_{23}$ respectively. By means of a third setting register (not shown) digital signals $F_3$ and $\overline{F}_3$ are applied to the gates of the transistors $T_{24}$ and $T_{25}$. By means of a fourth setting register (not shown) digital signals $F_4$ and $\overline{F}_4$ are applied to the gates of the transistors $T_{26}$ and $T_{27}$. Depending upon whether the digital signal applied to the said transistors is 0 or 1 the respective transistor will be non-conductive or conductive. Since in the filter shown in FIG. 4 four current dividing devices are used, the number of possible values which the respective weighting factor may assume is $2^4 = 16$. Thus the following values may be realized: 1, 13/15, 11/15, 9/15, 5/15, 3/15, 1/15, −1/15, −3/15, −5/15, −7/15, −9/15, −11/15, −13/15, −1. The said 4 setting registers may be conventional digital shift registers of the static type. This means that the information written in such a setting register can be retained indefinitely, in contradistinction to what is the case with the setting register P shown in FIG. 3 which is of the dynamic type. This means that the information written into such a register is lost after a given time owing to charge leakage from the storage capacitors. By means of the transversal filter shown in FIG. 4 both analog signals and digital signals can be filtered.

FIG. 5 shows an embodiment in which different current dividing devices are used. In the current dividing device I the main current path of an additional field-effect transistor $T'_0$ is connected in parallel with the main current path of the field-effect transistor $T_{00}$. The main current path of an additional transistor $T'_1$ is connected in parallel with the main current path of the transistor $T_{01}$. The gates of the additional transistors are connected to the current input of the current dividing device I. In the current dividing device II the main current path of an additional transistor $T'_2$ is connected in parallel with the main current path of the transistor $T_{20}$. The main current path of an additional transistor $T'_3$ is connected in parallel with the main current path of the transistor $T_{21}$. The gate electrodes of the latter additional transistors are connected to the current input of the current dividing device II.

The provision of the additional field-effect transistors $T'_0$, $T'_1$, $T'_2$ and $T'_3$ in the respective current dividing devices has the advantage that the resistance characteristic of the associated field-effect transistor is linearized. For example, the resistance characteristic of the field-effect transistor $T_{00}$ may be approximated by the sum of a linear part and a square-law part, while the difference characteristic of the transistor $T'_0$ can be approximated by the difference of a linear part and a square-law part. This means that the difference characteristic of the combination of the field-effect transistors $T_{00}$ and $T'_0$ will be more linear than the corresponding characteristic of the transistor $T_{00}$, because the square-law parts of the resistance characteristics of the two field-effect transistors will compensate for each other. A simple calculation shows that this compensation is an optimum if care is taken to ensure that the following relation holds:

$$\frac{\beta_1}{\beta_2}=1+\sqrt{\left|\frac{2q\cdot\epsilon\cdot N}{C^2_{ox}\cdot(2\phi_F-V_B)}\right|}$$

In this relation $\beta_1$ is a factor which is determined by the material and the geometry of the transistor $T_{00}$, $\beta_2$ is a similar factor for the transistor $T'_0$, $\epsilon$ is the dielectric constant of the silicon, $C_{0x}$ is the capacitance per unit of surface of the gate of the transistors, $V_B$ is the sum of the voltage between the gate and the substrate of the transistor $T_{00}$ and the voltage between the drain and the substrate of the transistor $T'_0$, $\phi_F$ is the difference voltage between the Fermi level and the intrinsic Fermi level, N is the doping concentration and $q$ is the elementary charge on an electron.

The shift registers used in the embodiments shown comprise field-effect transistors. Obviously the shift registers may be of different design, for example, as described in copending U.S. Pat. Application Ser. No. 299,748, filed Oct. 24, 1972 and commonly assigned. As a further alternative the shift registers may be designed as described, for example, in Electronics, June 21, 1971, pages 50 to 59.

What is claimed is:

1. A transversal filter having adjustable weighting factors, comprising a plurality of sequentially connected storage elements, each of the storage elements comprising a capacitor and a control electrode, a transfer circuit coupling a capacitor of each storage element to a capacitor of a succeeding storage element, means for applying periodic clock pulses to the control electrode of the storage elements for controlling the transfer of charge between the capacitors coupled by the transfer circuit, a charge difference amplifier having at least two input terminals, a plurality of current dividers associated with those storage elements that do not immediately follow each other in the sequence of storage elements, each current divider comprising a first and a second current path, setting means for controlling the proportion of current passing through the first current path with respect to the current passing through the second current path of each current divider, means connecting one end of the first and second current paths of the current dividers to capacitors of associated storage elements, means connecting each of the other ends of the first current paths of the current dividers to one input terminal of the charge difference amplifier, and means for connecting each of the other ends of the second current paths of the current dividers to the other input terminal of the charge difference amplifier, the charge difference amplifier providing current for all the capacitors associated with the dividers and providing an output signal corresponding to the difference between the total currents passing through the first and second current paths of all the dividers.

2. Transversal filter as claimed in claim 1, wherein each current dividing device includes a first and a second field-effect transistor, a main electrode of each of these field-effect transistors being connected to the control input of the current dividing device, the other main electrodes of the two transistors being each connected to a current output of the current dividing device, and means for applying to both control electrodes of the field effect transistors control voltages which determine proportion of the current division.

3. Transversal filter as claimed in claim 1, wherein at least in some current dividing devices there is connected in parallel with the main current paths of the first and second field-effect transistors the main current path of an additional field-effect transistor the gate of which is connected to the current input of the respective current dividing device.

4. Transversal filter as claimed in claim 1, wherein the charge difference amplifier comprises two differential amplifiers which each have two inputs and one output, one input of each differential amplifier being connected to a point of constant potential, the other inputs being connected to the current outputs of the current dividing devices, the output of each differential amplifier being connected to its input connected to a current output of the current dividing device by a capacitor which has a capacitance value greater than that of the storage capacitors.

* * * * *

UNITED STATES PATENT AND TRADEMARK OFFICE

CERTIFICATE OF CORRECTION

PATENT NO. : 3,809,923

DATED : May 7, 1974

INVENTOR(S) : LEONARD JAN MARIA ESSER

It is certified that error appears in the above-identified patent and that said Letters Patent are hereby corrected as shown below:

IN THE SPECIFICATION

Col. 1, line 35, "change" should be --charge--;

Col. 3, line 40, equation 5 should read -- $\Delta i = \frac{Y_x \cdot i}{V - V_d}$ --;

line 46, equation 6 should read -- $\Delta Q_x = \frac{V_x}{V - V_d} \cdot Q_x$ --;

line 54, equation 7 should read -- $\sum \Delta Q_x = \sum \frac{Y_x}{V - V_d} - Q_x$ --;

line 59, "C · $\tau$ V" should be --C · $\Delta$ V--;

Col. 4, line 5, equation 8 should read

--$\left( \frac{Y_o}{V - V_d} \cdot e^{jw3\tau} + \frac{Y_2}{V-V_d} \cdot e^{jw\tau} + \frac{Y_4}{V-V_d} \cdot e^{jw\tau} \right)$--;

UNITED STATES PATENT AND TRADEMARK OFFICE

CERTIFICATE OF CORRECTION

PATENT NO. : 3,809,923

DATED : May 7, 1974

INVENTOR(S) : LEONARD JAN MARIA ESSER

It is certified that error appears in the above-identified patent and that said Letters Patent are hereby corrected as shown below:

Col. 4, line 67, after "time interval" insert --$\tau_1$ the line b is connected to the input s and the line c is connected to the input r, while during the time interval --;

Col. 6, line 31, after "9/15," insert --7/15,--;

Signed and Sealed this

*fourth* Day of *November 1975*

[SEAL]

*Attest:*

RUTH C. MASON
*Attesting Officer*

C. MARSHALL DANN
*Commissioner of Patents and Trademarks*